United States Patent
Zheng

(10) Patent No.: US 11,338,877 B2
(45) Date of Patent: May 24, 2022

(54) TWO-WHEEL AUTOMATIC BALANCE RESET MECHANISM AND SYSTEM

(71) Applicant: Julian Zheng, Taizhou (CN)

(72) Inventor: Julian Zheng, Taizhou (CN)

( * ) Notice: Subject to any disclaimer, the term of this patent is extended or adjusted under 35 U.S.C. 154(b) by 355 days.

(21) Appl. No.: 16/654,029

(22) Filed: Oct. 16, 2019

(65) Prior Publication Data

US 2020/0070921 A1 Mar. 5, 2020

(30) Foreign Application Priority Data

Jun. 25, 2019 (CN) .......................... 201920967476.0

(51) Int. Cl.
*B62K 3/02* (2006.01)
*B62K 5/027* (2013.01)
*B62K 5/08* (2006.01)
*B62J 45/415* (2020.01)

(52) U.S. Cl.
CPC .............. *B62K 3/02* (2013.01); *B62K 5/027* (2013.01); *B62K 5/08* (2013.01); *B62J 45/4151* (2020.02)

(58) Field of Classification Search
CPC . B62K 5/027; B62K 5/08; B62K 5/10; B62K 3/02; B62K 2025/047; B60G 2300/45; B60G 2200/44; B60G 2202/413; B60G 2202/416; B60G 2300/122; B60G 2400/0511; B60G 2400/204; B60G 2400/51; B60G 2400/5182; B60G 2800/012; B60G 2800/20; B60G 17/017; B62J 45/4151; B62J 45/412
See application file for complete search history.

(56) References Cited

U.S. PATENT DOCUMENTS

| | | | | |
|---|---|---|---|---|
| 2007/0262549 A1* | 11/2007 | Haerr | ..................... | B62K 5/027 |
| | | | | 280/124.103 |
| 2014/0346753 A1* | 11/2014 | Huang | ..................... | B62D 9/04 |
| | | | | 280/269 |
| 2017/0174032 A1* | 6/2017 | Marabese | ............ | B60G 21/073 |

FOREIGN PATENT DOCUMENTS

| | | | | |
|---|---|---|---|---|
| AT | 522428 A1 | * | 10/2020 | |
| CN | 101161536 A | * | 4/2008 | ............. B62K 25/04 |
| CN | 102092435 A | * | 6/2011 | ............... B62K 5/10 |
| CN | 106573660 A | * | 4/2017 | ......... B60G 17/0162 |
| CN | 207208308 U | * | 4/2018 | |
| CN | 108438115 A | * | 8/2018 | |
| CN | 109367668 A | * | 2/2019 | |
| CN | 109955973 A | * | 7/2019 | |

(Continued)

*Primary Examiner* — James A English
*Assistant Examiner* — Scott F. Underwood

(57) ABSTRACT

The present disclosure belongs to the technical field of two-wheel vehicles. A two-wheel automatic balance reset mechanism comprises a balance bar arranged between a frame and each front wheel support, the balance bar comprises a piston cylinder and a piston rod, the piston rod is movably arranged in a piston chamber of the piston cylinder, two ends of the piston chamber are mutually interconnected to form a first channel, a main control valve is arranged on the first channel and divides the first channel into a medium intake end and a backflow end, a medium tank is arranged at the backflow end, a pump is arranged at the medium intake end, and the pump is interconnected with the medium tank. A system comprises a main control module and an acquisition module, and the acquisition module comprises a balance sensor arranged on the frame and a speed sensor.

11 Claims, 7 Drawing Sheets

(56) References Cited

FOREIGN PATENT DOCUMENTS

| DE | 102016010364 A1 | * | 3/2018 | ............... B62K 5/10 |
| EP | 3093169 A1 | * | 11/2016 | ............. B62K 5/027 |
| EP | 3189992 A1 | * | 7/2017 | ................ F16F 9/44 |
| EP | 3357720 A1 | * | 8/2018 | ........... B60G 21/106 |
| EP | 3434570 A1 | * | 1/2019 | ............... B62K 5/10 |
| FR | 2953184 A1 | * | 6/2011 | ............... B62K 5/05 |
| FR | 3037279 A1 | * | 12/2016 | ........... B60G 21/067 |
| WO | WO-02068228 A1 | * | 9/2002 | ........ B60G 21/0555 |
| WO | WO-2017157976 A1 | * | 9/2017 | ............. B60G 11/30 |
| WO | WO-2020157664 A1 | * | 8/2020 | ............. B62K 5/027 |

* cited by examiner

US 11,338,877 B2

TWO-WHEEL AUTOMATIC BALANCE RESET MECHANISM AND SYSTEM

TECHNICAL FIELD

The present disclosure belongs to the technical field of two-wheel vehicles, and specifically relates to a two-wheel automatic balance reset mechanism and system.

BACKGROUND

The disclosure with Chinese Patent Application No. 200910254181.X discloses an overturn preventing device for a vehicle with two front wheels. The vehicle with the two front wheels comprises a frame with a hollow positioning piece, a front wheel unit corresponding to the positioning piece, and a steering unit used for controlling the front wheel unit. The overturn preventing device comprises a tilting unit pivoted to the positioning piece, and a locking unit used for locking the tilting unit, the locking unit is provided with a hydraulic locking mechanism integrated on the tilting unit, and the tilting unit is controlled to tilt relative to the positioning piece through the hydraulic locking mechanism such that the tilting unit is locked in time to avoid the overturn of the vehicle with the two front wheels caused by the tilting of the tilting unit relative to the positioning piece.

After the vehicle stops, a rider needs to adjust the vehicle by self in order to restore the vertical state of the vehicle, which is laborious and time-consuming; and if not adjusting the vehicle, the rider is very uncomfortable on the tilted vehicle.

SUMMARY

An objective of the present disclosure is to provide a simply structured, safe and comfortable two-wheel automatic balance reset mechanism, and system.

The objective of the present disclosure is achieved as follows:

the two-wheel automatic balance reset mechanism comprises a frame, a main vertical tube is fixedly arranged at the front end of the frame, a handlebar rod is, rotationally arranged in the main vertical tube, front wheel supports are symmetrically arranged on two sides of the main vertical tube, a balance bar is hinged between the frame and each front wheel support, the balance bar comprises a piston cylinder and a piston rod, the piston rod is movably arranged in a piston chamber of the piston cylinder, two ends of the piston chamber are mutually interconnected to form a first channel, a main control valve is arranged on the first channel and divides the first channel into a medium intake end and a backflow end, a medium tank is arranged at the backflow end, a pump is arranged at the medium intake end, and the pump is interconnected with the medium tank.

Preferably, the backflow ends of the two balance bars are connected with the same medium tank while the medium intake ends thereof are connected with the pump respectively through a left filling valve and a right filling valve.

Preferably, an energy storage tank is arranged between the left filling valve/the right filling valve and the pump, and a pressure sensor is arranged on the energy storage tank.

Preferably, the pump is driven by a motor, and a check valve is arranged at a liquid outlet end of the pump.

Preferably, the front wheel support comprises a main rod, a rotating seat and a damper, the damper is rotationally arranged at the, lower end of the main rod through the rotating seat, the main vertical tube is respectively hinged with the main rods through swing arm assemblies, a steering assembly is arranged between the handlebar rod and each rotating seat, and a front wheel is arranged at the lower end, of the damper.

Preferably, the swing arm assembly comprises a plurality of swing arms and first, rotating pins, and two ends of the swing arm are respectively arranged on the main rod through the first rotating pins.

Preferably, a group of symmetric swing arms are fixedly connected with a connecting plate, and a connecting rod is hinged between the two connecting plates.

Preferably, a main rotating component is hinged at the bottom of the handlebar rod, a secondary rotating component is hinged at each rotating seat, and a steering arm is hinged between the main rotating component and each secondary rotating component.

Preferably, the piston chamber and an interconnected chamber are arranged in the piston cylinder, and the upper ends of the piston chamber and the interconnected chamber are mutually interconnected through a normally opened main control valve while the lower ends thereof are mutually interconnected through an interconnected pore.

A two-wheel automatic balance reset system comprises the two-wheel automatic balance reset mechanism and a control system, the control system comprises a main control module and an acquisition module, the acquisition module comprises a balance sensor arranged on the frame and a speed sensor.

Compared with the prior art, the present disclosure has the following outstanding and beneficial technical effects:

the main control valve of the present disclosure achieves locking of the balance bars, and when the vehicle is tilted, the pump drives the balance bars to achieve automatic reset of the frame and quickly adjust the vehicle and the position of a rider such that the rider rides the vehicle more safely and comfortably; and the present disclosure acquires a vehicle speed by the speed sensor and acquires a position of the vehicle through the balance sensor to automatically controlling the state of the vehicle in real time so as to have the characteristics of simple structure, high efficiency, convenience in use and the like.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments in the present disclosure, and a person of, ordinary skill in the art may still derive other drawings from these accompanying drawings without creative efforts, wherein.

Figure 1:
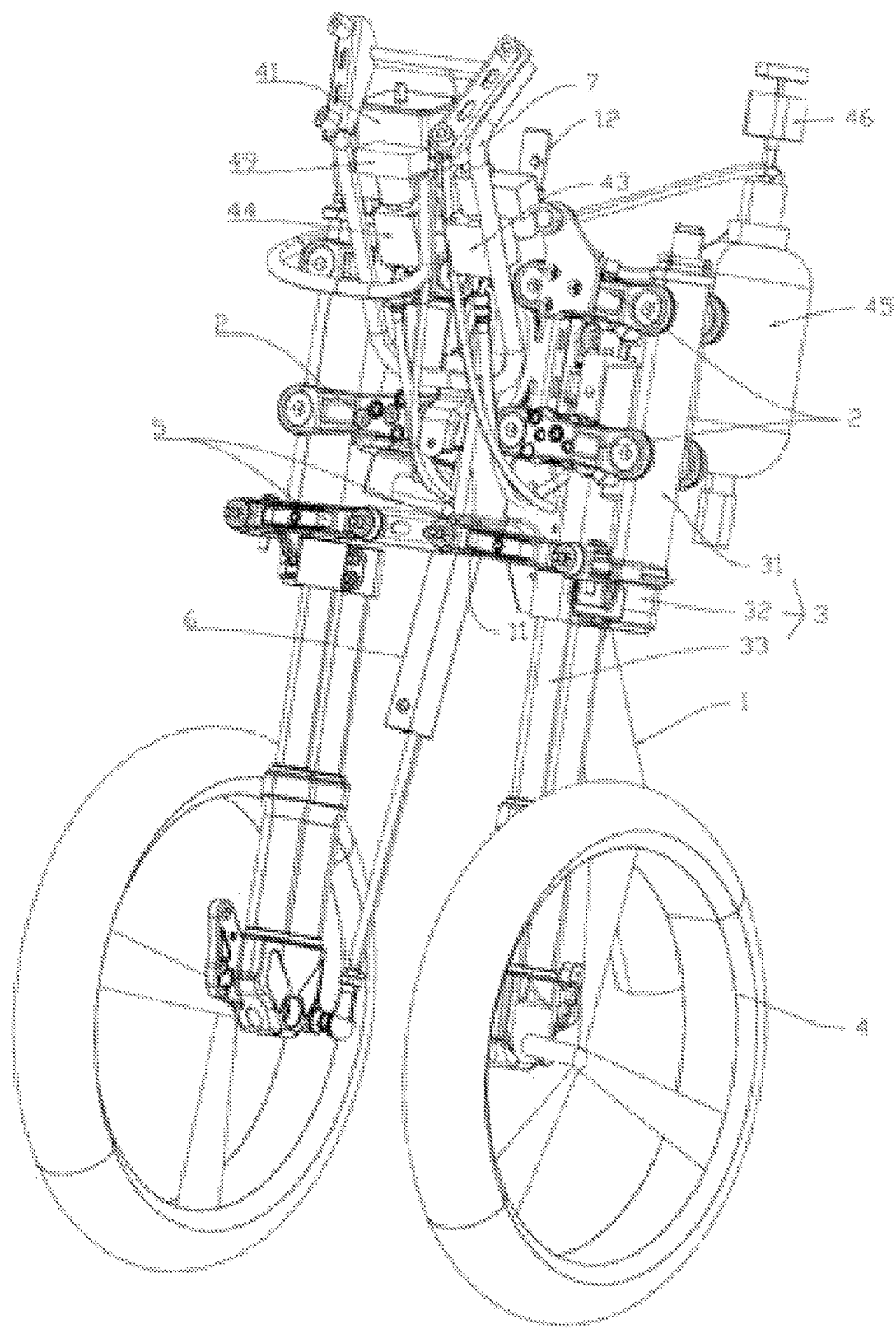
FIG. 1 is a front structural view of the present disclosure.
Figure 2:
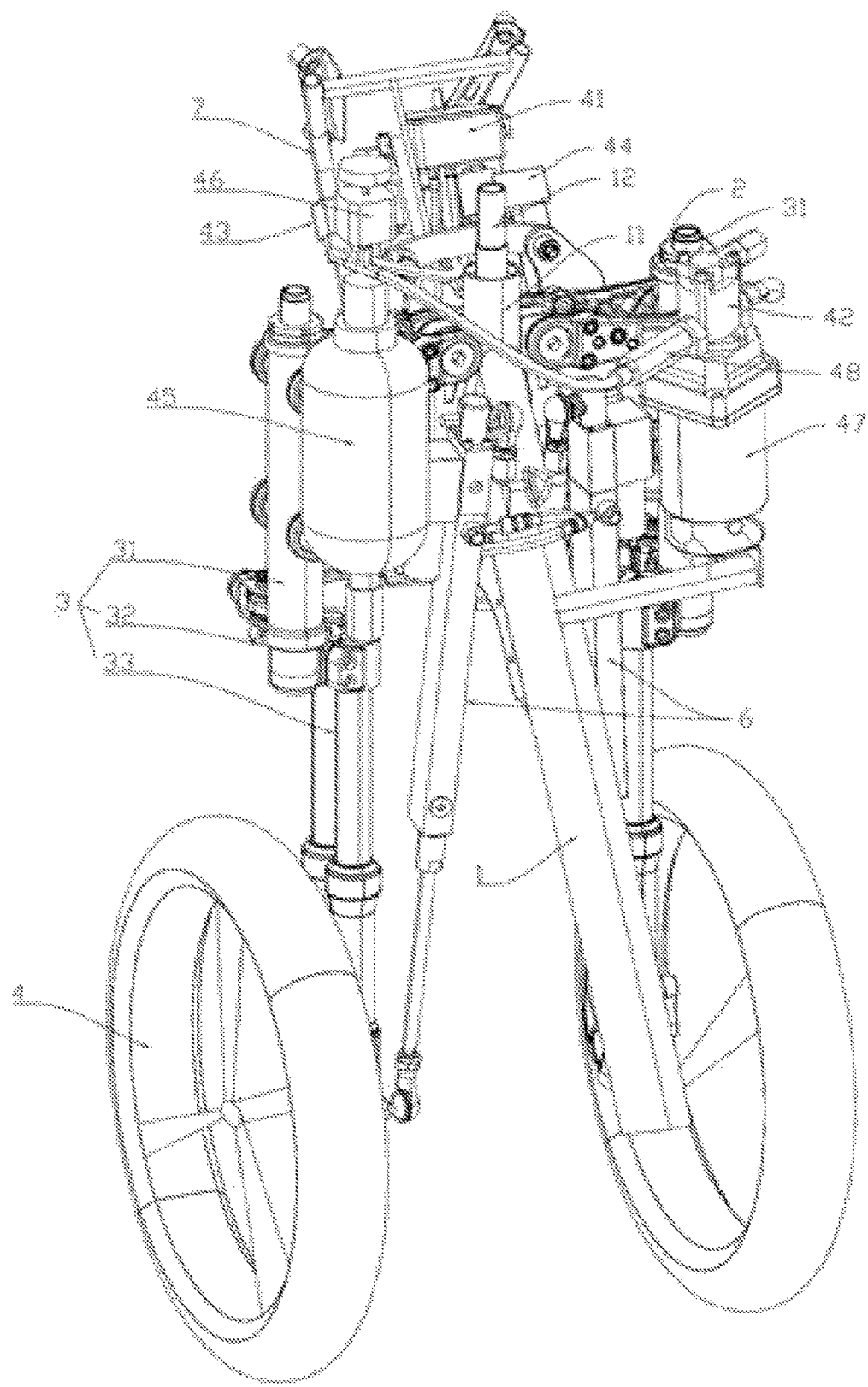
FIG. 2 is a back structural view of the present disclosure.
Figure 3:
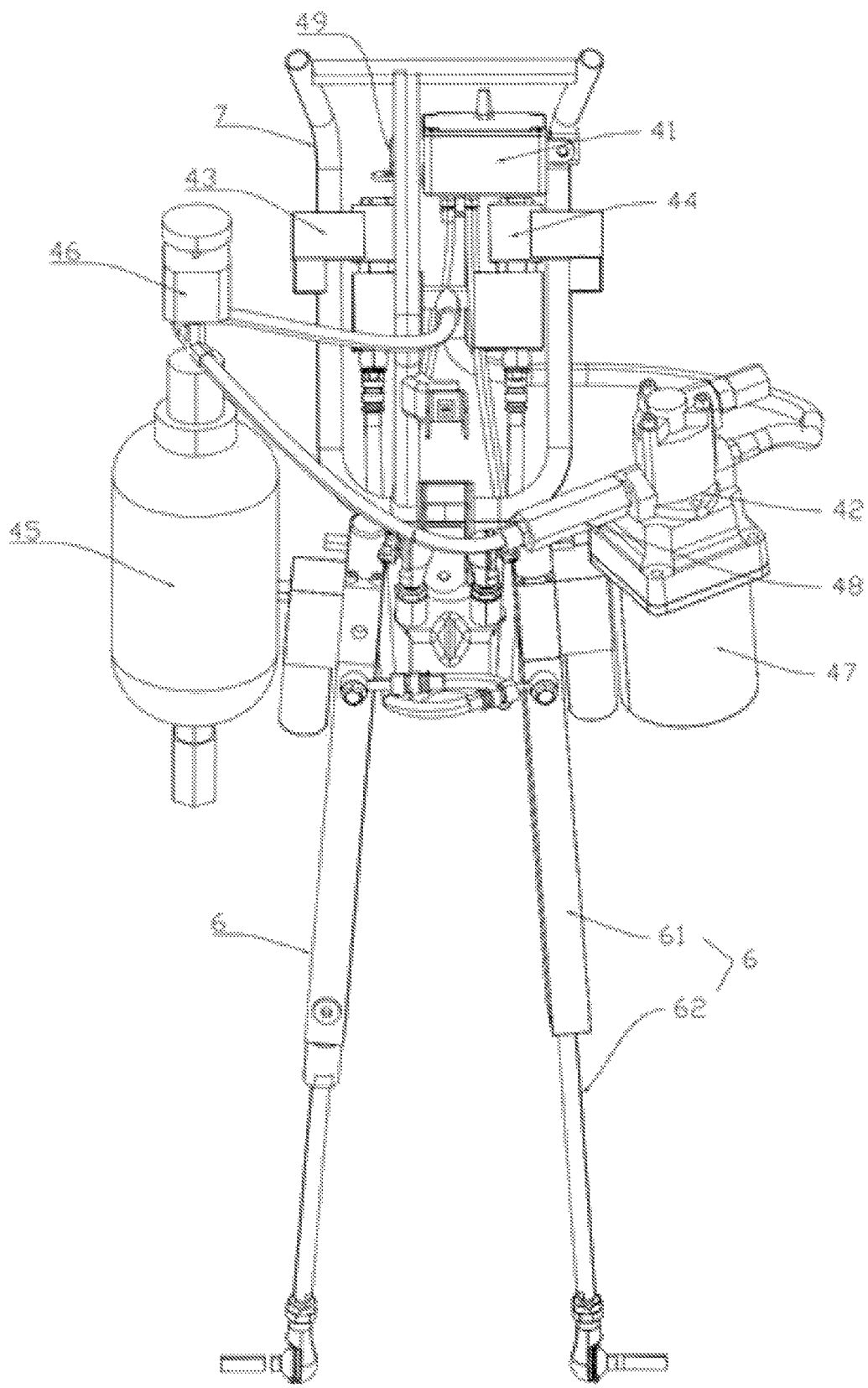
FIG. 3 is a schematic structural diagram after a steering mechanism is removed from the present disclosure.

In the drawings: 1-frame, 2-swing arm assembly, 3-front wheel support, 4-front wheel, 5-steering assembly, 6-balance bar, 11-main vertical tube, 12-handlebar rod, 7-mounting rack, 21-swing arm, 22-first rotating pin, 23-connecting plate, 24-connecting rod, 31-main rod, 32-rotating seat, 33-damper, 34-main rotating component, 35-secondary rotating component, 36-steering arm, 41-medium tank, 42-pump, 43-left filling valve, 44-right filling valve, 45-energy storage tank, 46-pressure sensor, 47-motor, 48-check valve, 49-balance sensor, 61-piston cylinder, 62-piston rod, 63-piston cylinder, 64-main control valve, 65-medium intake end 66-backflow end, 67-interconnected chamber, and 68-interconnected pore.

DESCRIPTION OF THE EMBODIMENTS

The following further describes the present disclosure with reference to specific embodiments.

Embodiment 1

As shown in FIG. 1 to FIG. 4, a two-wheel automatic balance reset system comprises a two-wheel automatic balance reset mechanism and a control system, the two-wheel automatic balance reset mechanism comprises a frame 1, a main vertical tube 11 is fixedly arranged at the front end of the frame 1, a handlebar rod 12 is rotationally arranged in the main vertical tube 11, front wheel supports 3 are symmetrically arranged on two sides of the main vertical tube 11, a balance bar 6 is hinged between the frame 1 and each front wheel support 3, and the balance bar 6 is hinged with the frame and the front wheel support through ball connectors so as to facilitate movement of the balance bar 6 when the vehicle turns. The balance bar 6 comprises a piston cylinder 61 and a piston rod 62, the piston chamber 63 and an interconnected chamber 67 are arranged, in the piston, cylinder 61, the piston rod 62 is movably arranged in the piston chamber 63, and the upper ends of the piston chamber 63 and the interconnected chamber 67 are mutually interconnected through a normally opened main control valve 64 while the lower ends thereof are mutually interconnected through an interconnected pore 68. The piston chamber 63, an inner chamber of the main control valve 64, the interconnected chamber 67 and the interconnected pore 68 form a first channel, and when the vehicle normally runs, the main control valve 64 is normally opened, a medium randomly moves in the first channel, and the piston rod 62 moves along with the movement of a front wheel. When the vehicle is tilted, the main control valve 64 is controlled to be switched off, and the piston rod 62 is locked such that a steering structure of the vehicle is locked.

The main control valve 64 divides the first channel into a medium intake end 65 and a backflow end 66, a medium tank 41 is arranged at the backflow end 66, a breathing valve and a filling opening are arranged on the medium tank 41, and when the medium is liquid, the medium is filled through the filling opening. A pump 42 is arranged at, the medium intake end 65, the pump 42 is driven by a motor 47, and a cheek valve 48 is arranged at a liquid outlet end of the pump to prevent backflow. A liquid inlet end of the pump 42 is interconnected with the medium tank 41, and the medium can be hydraulic oil or gas, preferably the hydraulic oil, because the hydraulic oil has a low sealing requirement, is not easy to leak and has high control accuracy. At this time, the medium tank 41 is a transparent oil tank with a liquid storage scale helping the rider to observe and supplement the amount of the medium.

In order to control the cost and the, size, the backflow ends 66 of the two balance bars 6 are connected with the same medium tank 41, the medium intake ends 65 of the two balance bars 6 are respectively connected with the pump 42 through a left filling valve 43 and a right filling valve 44, the left filling valve 43 and the right filling valve 44 are normally closed and are mounted on a mounting rack 7 at the front of the frame, an energy storage tank 45 is arranged between the left filling valve 43/the right filling valve 44 and the pump 42, and a pressure sensor 46 is arranged on the energy storage tank 45. When the whole vehicle is powered on, the pressure sensor can sense the internal pressure change of the energy storage tank, and when the pressure is reduced to a certain value, the motor and the pump are started to pressurize the energy storage tank in order to store the energy. At a high pressure state, the balance bars can be directly driven to operate to prevent influence on the service life caused by frequent operation of the motor and the pump. The pressure generated by once operation of the motor and the pump can be used by the balance bars for ten times, and if frequent starting of the motor and the pump is not considered, the energy storage tank 45 and the pressure sensor 46 can be removed.

The control system comprises a main control module and an acquisition module, the acquisition module comprises a balance sensor 49 arranged on the frame 1 and a speed sensor arranged on the front wheel support 3 or other position of the vehicle, the balance sensor 49 may be an electronic gyroscope sensor or other device capable of sensing the balance of a vehicle body; and the main control module controls the main control valve 64, the motor 47, the left filling valve 43 and the right filling valve 44 to operate.

Figure 4:
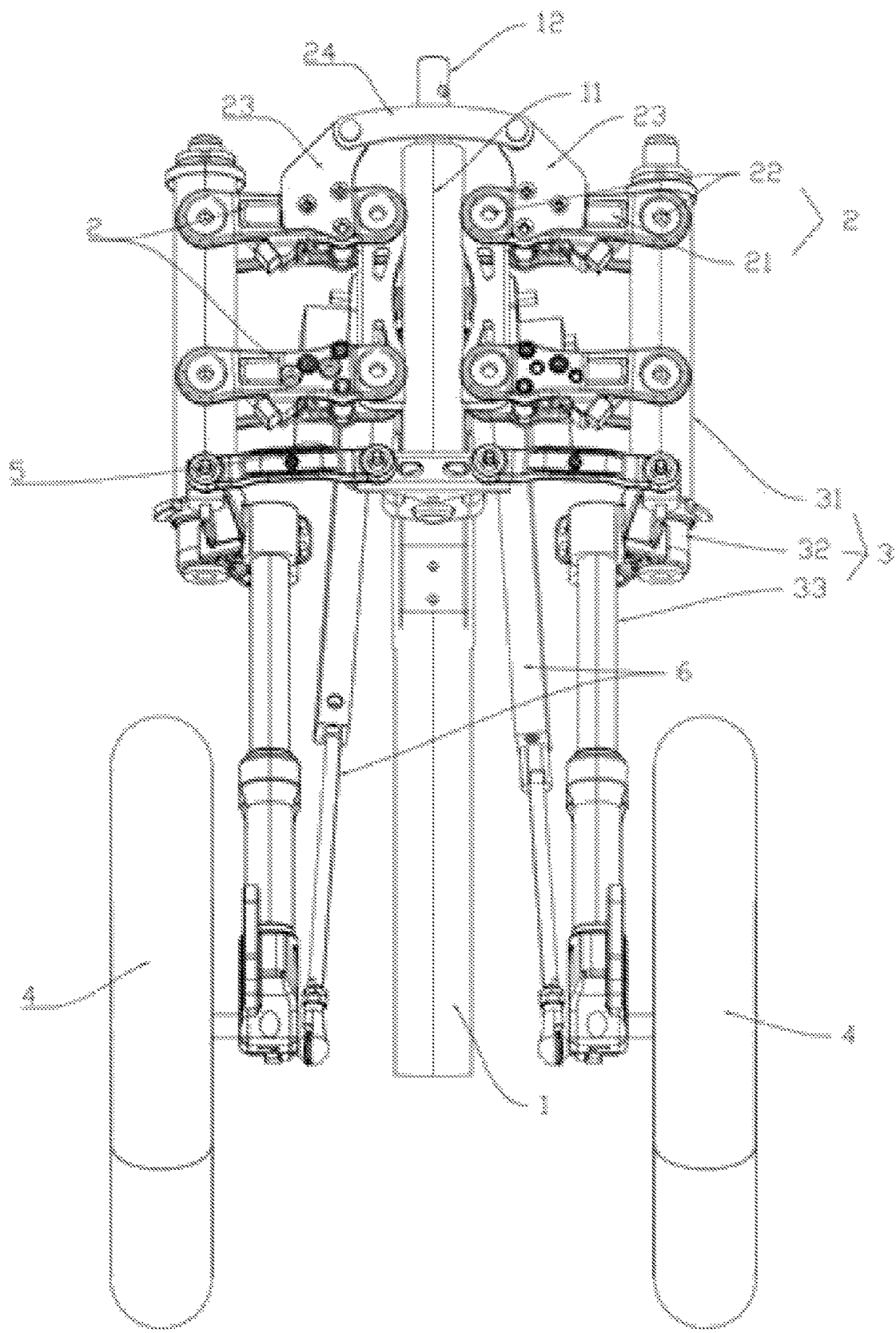
FIG. 4 is a schematic structural diagram of a steering mechanism of the present disclosure.

The automatic balance reset principle is as follows:

as shown in FIG. 4, when the speed sensor detects that the vehicle speed is equal to 0 or a certain preset vehicle speed, the main control module starts the balance sensor 49, and the balance sensor 49 senses a position of the vehicle body and transmits a signal to the main control module;

if the vehicle body is located at a balance position, the balance sensor 49 transmits a signal to the main control module, and the main control module transmits an instruction to power the main control valves 64 on the balance bars 6 such that the piston rods 62 of the balance bars 6 cannot move up and down to keep a balance state;

if the vehicle, body is tilted to the left side, the main control valve 64 on the left side is switched off, the left filling valve 43 is switched on, the energy storage tank drives the balance bar 6 on the left side to stretch out till the balance sensor 49 senses that the vehicle body is located at a horizontal position, the main control valve 64 on the right side and the left filling valve 43 on the left side are switched off, and the vehicle body keeps the balance, state; and if the vehicle body is tilted to the right side, the main control valve 64 on the right side is switched off, the right filling valve 44 is switched on, the energy storage tank drives the balance bar 6 on the right side to stretch out till the balance sensor 49 senses that the vehicle body is located at the horizontal position. the main control valve 64 on the left side and the right filling valve 44 on the right side are switched off. and the vehicle body keeps the balance state.

Figure 5:
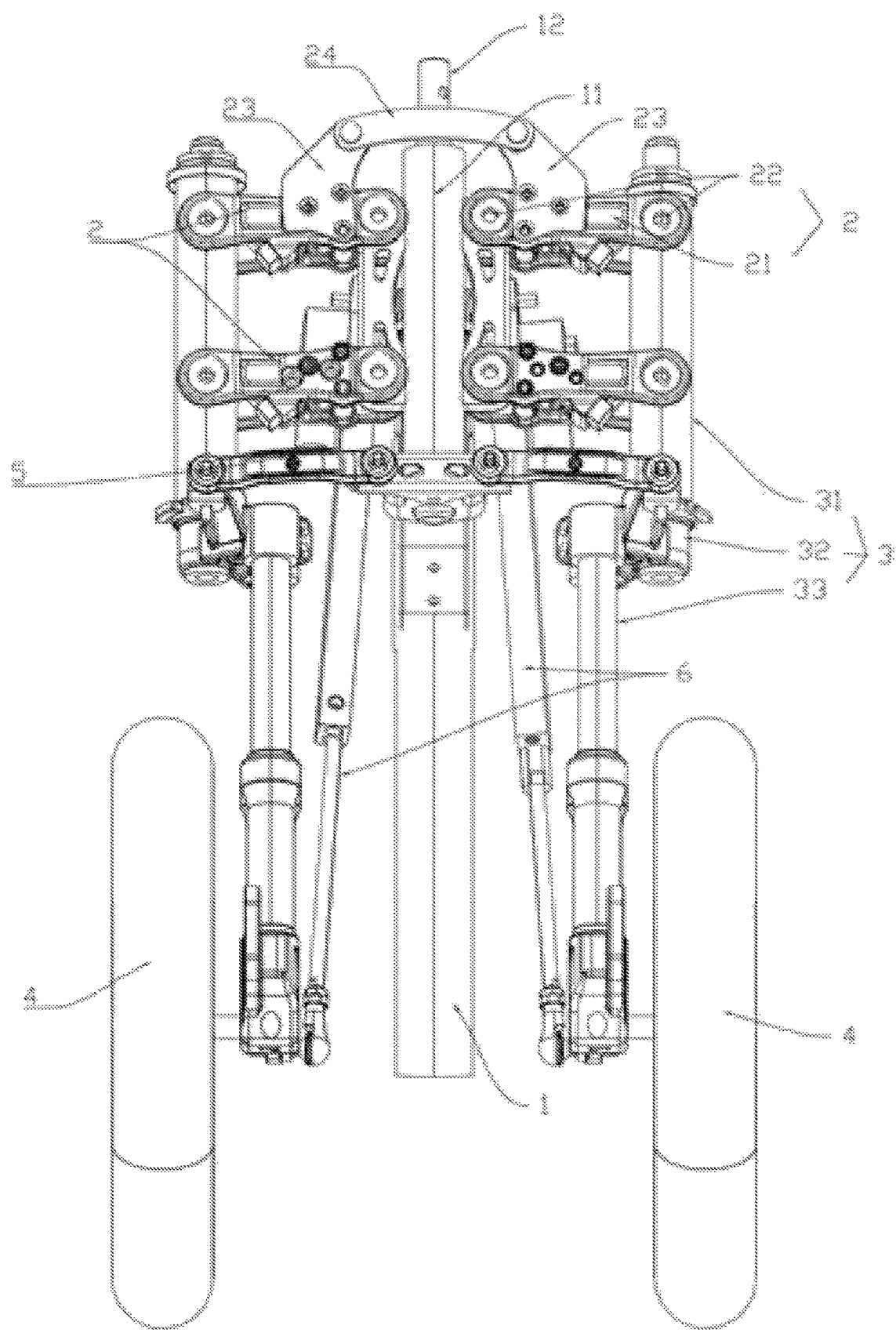
FIG. 5 is a partially enlarged view of a steering mechanism of the present disclosure.
Figure 6:
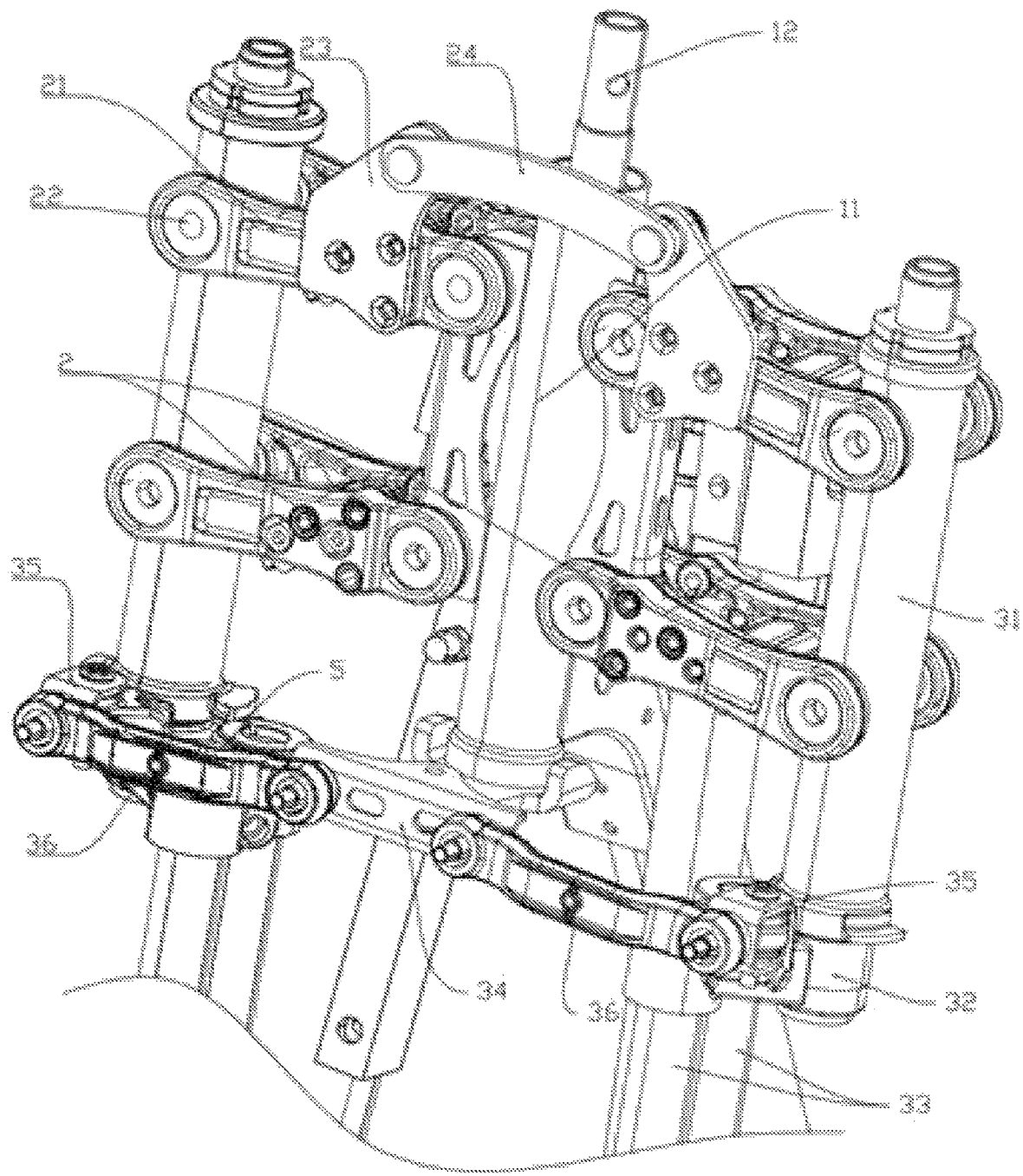
FIG. 6 is a schematic diagram of a first embodiment of the present disclosure.

The following specifically introduces the steering structure of the two-wheel vehicle: as shown in FIG. 5 and FIG. 6, the front wheel support 3 comprises a main rod 31, a rotating seat 32 and a damper 33, a front wheel 4 is arranged at the lower end of the damper 33, the upper end of the damper 33 is rotationally arranged at the lower end of the main rod 31 through the rotating seat 32, the main vertical tube 11 is respectively hinged with the main rods 31 through swing arm assemblies 2, the swing arm assembly 2 comprises four swing arms 21 and eight first rotating pins 22, and two ends of the swing arm 21 are respectively arranged on the main rod 31 through the first rotating pins 22. A first group of the swing arms 21 are fixedly connected with a connecting plate 23, and a connecting rod 24 is hinged between the two connecting plates 23. A steering assembly 5 is arranged between the handlebar rod 12 and each rotating seat 32, a main rotating component 34 capable of rotating left and right is hinged at the bottom of the handlebar rod 12, a secondary rotating component 35 capable of rotating left and right is hinged at each rotating seat 32, and a steering arm 36 capable of rotating up and down is hinged between the main rotating component 34 and each secondary rotating component 35.

Embodiment 2

Figure 7:
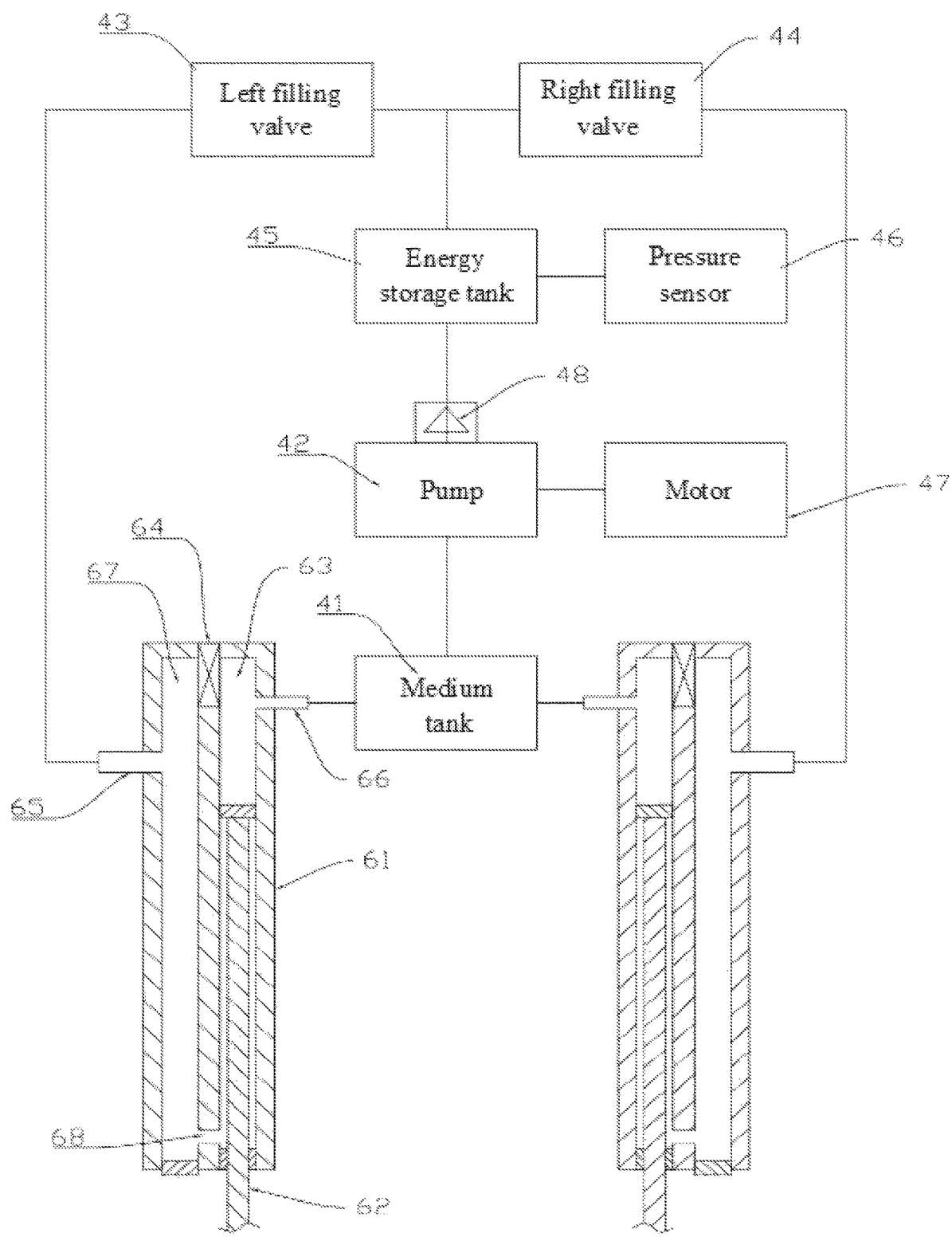
FIG. 7 is a schematic diagram of a first embodiment of the present disclosure.

Embodiment 1 and Embodiment 2 are basically the same, and their difference is: the balance bar is reversely mounted, that is, and the medium intake end of the balance bar is interconnected with a lower cavity of the piston chamber while the backflow end is interconnected with an upper cavity of the piston chamber. As shown in FIG. 7, the principle of Embodiment 2 is the same as, that of Embodiment 1:

when the speed sensor detects that the vehicle speed is equal to 0 or a certain preset vehicle speed, the main control module starts the balance sensor 49, and the balance sensor 49 senses a position of the vehicle body and transmits a signal to the main control module;

if the vehicle body is located at a balance position, the balance sensor 49 transmits a signal to the main control module, and the main control module transmits an instruction to power the main control valves 64 on the balance bars 6 such that the piston rods 62 of the balance bars 6 cannot move up and down to keep a balance state;

if the vehicle body is tilted to the left side, the main control valve 64 on the left side is switched off, the left filling valve 43 is switched on, the energy storage tank drives the balance bar 6 on the left side to stretch out till the balance sensor 49 senses that the vehicle body is located at a horizontal position, the main control valve 64 on the right side and the left filling valve 43 on the left side are switched off, and the vehicle body keeps the balance state; and if the vehicle body is tilted to the right side, the main control valve 64 on the right side is switched off, the right filling valve 44 is switched on, the energy storage tank drives the balance bar 6 on the right side to stretch out till the balance sensor 49 senses that the vehicle body is located at the horizontal position, the main control valve 64 on the left side and the right filling valve 44 on the, right side are switched off, and the vehicle body keeps the balance state.

Embodiment 3

Embodiment 3 and Embodiment 1 are basically the same, and their difference is: the balance bars of Embodiment 3 are independently controlled respectively through two pumps so as to omit two filling valves.

The above merely describes preferred embodiments of the present disclosure, but are not used to limit the protection scope of the present disclosure. Any equivalent changes according to the structure, the shape and the principle of the present disclosure shall be all contained in the protection scope of the present disclosure.

What is claimed is:

1. A two-wheel automatic balance reset mechanism, comprising a frame (1), wherein a main vertical tube (11) is fixedly arranged at a front end of the frame (1), a handlebar rod (12) is rotationally arranged in the main vertical tube (11), and front wheel supports (3) are symmetrically arranged on two sides of the main vertical tube (11); and a balance bar (6) is hinged between the frame (1) and each front wheel support (3), the balance bar (6) comprising a piston cylinder (61) and a piston rod (62), the piston rod (62) is movably arranged in a piston chamber (63) of the piston cylinder (61), two ends of the piston chamber (63) are mutually interconnected to form a first channel, a main control valve (64) is arranged on the first channel and divides the first channel into a medium intake end (65) and a backflow end (66), a medium tank (41) is arranged at the backflow end (66), a pump (42) is arranged at the medium intake end (65), and the pump (42) is interconnected with the medium tank (41);

a main rotating component (34) is hinged at a bottom of the handlebar rod (12), a secondary rotating component (35) is hinged at a rotating seat (32), and a steering arm (36) is hinged between the main rotating component (34) and the secondary rotating component (35).

2. The two-wheel automatic balance reset mechanism according to claim 1, wherein the backflow ends (66) of two balance bars (6) are connected with a same medium tank (41) while the medium intake ends (65) thereof are connected with the pump (42) respectively through a left filling valve (43) and a right filling valve (44).

3. The two-wheel automatic balance reset mechanism according to claim 2, wherein an energy storage tank (45) is arranged between the left filling valve (43)/the right filling valve (44) and the pump (42), and a pressure sensor (46) is arranged on the energy storage tank (45).

4. The two-wheel automatic balance reset mechanism according to claim 3, wherein the pump (42) is driven by a motor (47), and a check valve (48) is arranged at a liquid outlet end of the pump.

5. The two-wheel automatic balance reset mechanism according to claim 2, wherein the pump (42) is driven by a motor (47), and a check valve (48) is arranged at a liquid outlet end of the pump.

6. The two-wheel automatic balance reset mechanism according to claim 1, wherein the pump (42) is driven by a motor (47), and a check valve (48) is arranged at a liquid outlet end of the pump.

7. The two-wheel automatic balance reset mechanism according to claim 1, wherein the front wheel support (3) comprises a main rod (31), the rotating seat (32) and a damper (33), the damper (33) is rotationally arranged at the lower end of the main rod (31) through the rotating seat (32), the main vertical tube (11) is respectively hinged with the main rods (31) through swing arm assemblies (2), a steering assembly (5) is arranged between the handlebar rod (12) and the rotating seat (32), and a front wheel (4) is arranged at the lower end of the damper (33).

8. The two-wheel automatic balance reset mechanism according to claim 7, wherein the swing arm assembly (2) comprises a plurality of swing arms (21) and first rotating pins (22), and two ends of the swing arm (21) are respectively arranged on the main rod (31) through the first rotating pin (22).

9. The two-wheel automatic balance reset mechanism according to claim 8, wherein two swing arms (21) of the plurality of swing arms are symmetrically arranged and each of the two swing arms is fixedly connected with a connecting plate (23); and a connecting rod (24) is hinged to the connecting plate (23).

10. The two-wheel automatic balance reset mechanism according to claim 1, wherein the piston chamber (63) and an interconnected chamber (67) are arranged in the piston cylinder (61), and an upper end of the piston chamber (63) and an upper end of the interconnected chamber (67) are mutually interconnected through a normally opened main control valve (64) while a lower end of the piston chamber (63) and a lower end of the interconnected chamber (67) are mutually interconnected through an interconnected pore (68).

11. A two-wheel automatic balance reset system, wherein the system comprises the two-wheel automatic balance reset mechanism of claim 1 and a control system, the control system comprising a main control module and an acquisition module, the acquisition module comprising a balance sensor (49) arranged on the frame (1) and a speed sensor.

\* \* \* \* \*